(12) United States Patent
Brock et al.

(10) Patent No.: US 8,740,084 B2
(45) Date of Patent: Jun. 3, 2014

(54) METHOD AND APPARATUS FOR PROJECTING ILLUMINATION PATTERNS FROM BARCODE READERS

(75) Inventors: Christopher Brock, Manorville, NY (US); Edward Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 408 days.

(21) Appl. No.: 12/616,804

(22) Filed: Nov. 12, 2009

(65) Prior Publication Data

US 2011/0108628 A1   May 12, 2011

(51) Int. Cl.
*G06K 7/10* (2006.01)

(52) U.S. Cl.
USPC .............. 235/462.42; 235/462.3; 235/462.31

(58) Field of Classification Search
USPC ............... 235/375, 383, 435, 439, 440, 454, 235/462.01, 462.06, 462.09, 462.11, 235/462.14, 462.2, 462.22, 462.3–462.33, 235/462.41–462.43, 470
See application file for complete search history.

(56) References Cited

U.S. PATENT DOCUMENTS

| | | | | |
|---|---|---|---|---|
| 5,095,203 A * | 3/1992 | Sato et al. | .................. | 250/222.1 |
| 5,801,370 A * | 9/1998 | Katoh et al. | ............. | 235/462.01 |
| 5,936,218 A * | 8/1999 | Ohkawa et al. | ......... | 235/462.01 |
| 6,469,294 B2 * | 10/2002 | Ohkawa et al. | ............. | 250/235 |
| 6,854,655 B2 * | 2/2005 | Barkan | ....................... | 235/462.4 |
| 6,974,083 B1 * | 12/2005 | Kahn et al. | ............... | 235/462.14 |
| 7,178,732 B1 * | 2/2007 | Barron et al. | ............ | 235/462.14 |
| 7,527,207 B2 * | 5/2009 | Acosta et al. | ............ | 235/462.31 |
| 7,546,952 B2 * | 6/2009 | Knowles et al. | ......... | 235/462.42 |
| 7,571,858 B2 * | 8/2009 | Knowles et al. | ......... | 235/462.14 |
| 7,575,170 B2 * | 8/2009 | Knowles et al. | ......... | 235/462.42 |
| 7,588,188 B2 * | 9/2009 | Knowles et al. | ......... | 235/462.42 |
| 7,614,560 B2 * | 11/2009 | Knowles et al. | ......... | 235/462.42 |
| 7,954,719 B2 * | 6/2011 | Zhu et al. | .................. | 235/462.42 |
| 2001/0019104 A1 * | 9/2001 | Ohkawa et al. | ............... | 250/234 |
| 2003/0010825 A1 * | 1/2003 | Schmidt et al. | .......... | 235/462.14 |
| 2003/0201326 A1 * | 10/2003 | Bobba et al. | ............. | 235/462.14 |
| 2003/0205620 A1 * | 11/2003 | Byun et al. | ................ | 235/462.14 |
| 2004/0000591 A1 * | 1/2004 | Collins et al. | ............ | 235/462.14 |
| 2006/0180670 A1 * | 8/2006 | Acosta et al. | ............ | 235/462.31 |
| 2008/0110992 A1 * | 5/2008 | Knowles et al. | ......... | 235/462.14 |
| 2008/0128509 A1 * | 6/2008 | Knowles et al. | ......... | 235/462.42 |
| 2008/0249884 A1 * | 10/2008 | Knowles et al. | ................. | 705/23 |
| 2008/0283611 A1 * | 11/2008 | Knowles et al. | ......... | 235/462.42 |
| 2009/0065584 A1 * | 3/2009 | Knowles et al. | ......... | 235/462.42 |
| 2009/0101718 A1 * | 4/2009 | Knowles et al. | ......... | 235/462.42 |
| 2009/0101719 A1 * | 4/2009 | Knowles et al. | ......... | 235/462.42 |
| 2009/0108074 A1 * | 4/2009 | Vinogradov | ............. | 235/462.42 |

\* cited by examiner

*Primary Examiner* — Paultep Savusdiphol
(74) *Attorney, Agent, or Firm* — Nong-Qiang Fan

(57) ABSTRACT

A method and apparatus for projecting illumination patterns from barcode readers. The apparatus includes a housing, an invisible illumination light source, and a visible illumination light source. The housing comprises a first window located in a generally horizontal plane and a second window located in a generally upright plane that intersects the generally horizontal plane. The invisible illumination light source is operative to project an invisible illumination pattern that is at least partially incident upon the first window or the second window after the invisible illumination pattern is projected out of the housing. The visible illumination light source operative to project a visible illumination pattern out of the housing, and the visible illumination pattern has a visible center ray propagating in a direction different from the invisible center ray of the invisible illumination pattern.

12 Claims, 14 Drawing Sheets

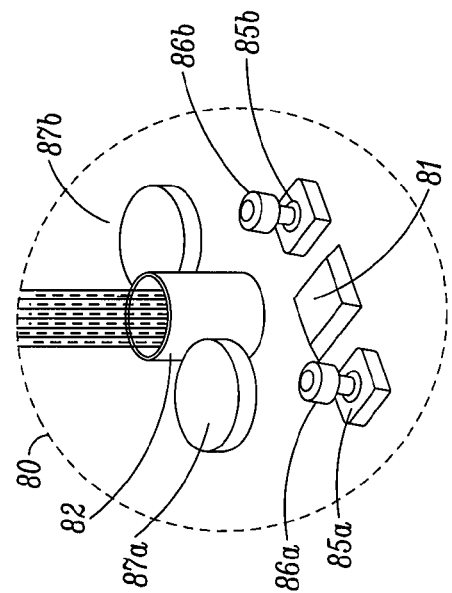
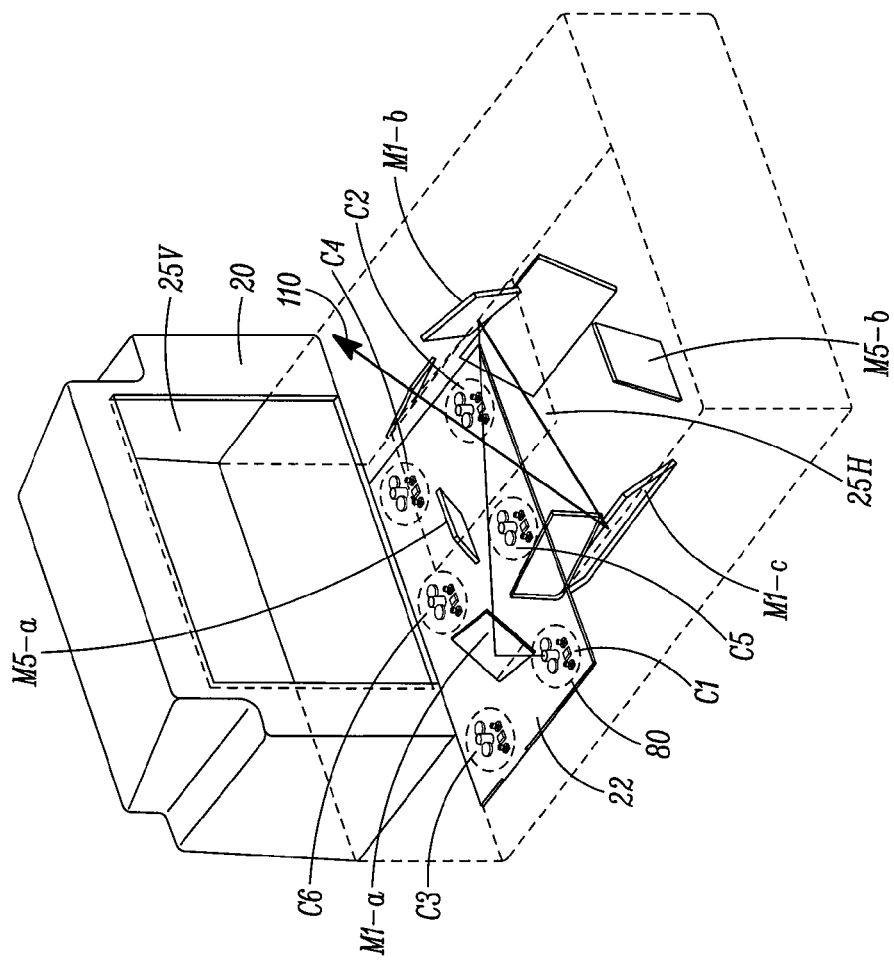

METHOD AND APPARATUS FOR PROJECTING ILLUMINATION PATTERNS FROM BARCODE READERS

FIELD OF THE DISCLOSURE

The present invention relates to imaging-based barcode readers.

BACKGROUND

Various electro-optical systems have been developed for reading optical indicia, such as bar codes. A bar code is a coded pattern of graphical indicia comprised of a series of bars and spaces of varying widths, the bars and spaces having differing light reflecting characteristics. The pattern of the bars and spaces encode information. Bar code may be one dimensional (e.g., UPC bar code) or two dimensional (e.g., DataMatrix bar code). Systems that read, that is, image and decode bar codes employing imaging camera systems are typically referred to as imaging-based bar code readers or bar code scanners.

Imaging-based bar code readers may be portable or stationary. A portable bar code reader is one that is adapted to be held in a user's hand and moved with respect to a target indicia, such as a target bar code, to be read, that is, imaged and decoded. Stationary bar code readers are mounted in a fixed position, for example, relative to a point-of-sales counter. Target objects, e.g., a product package that includes a target bar code, are moved or swiped past one of the one or more transparent windows and thereby pass within a field of view of the stationary bar code readers. The bar code reader typically provides an audible and/or visual signal to indicate the target bar code has been successfully imaged and decoded. Sometimes barcodes are presented, as opposed to be swiped. This typically happens when the swiped barcode failed to scan, so the operator tries a second time to scan it. Alternately, presentation is done by inexperience users, such as when the reader is installed in a self check out installation.

A typical example where a stationary imaging-based bar code reader would be utilized includes a point of sale counter/cash register where customers pay for their purchases. The reader is typically enclosed in a housing that is installed in the counter and normally includes a vertically oriented transparent window and/or a horizontally oriented transparent window, either of which may be used for reading the target bar code affixed to the target object, i.e., the product or product packaging for the product having the target bar code imprinted or affixed to it. The sales person (or customer in the case of self-service check out) sequentially presents each target object's bar code either to the vertically oriented window or the horizontally oriented window, whichever is more convenient given the specific size and shape of the target object and the position of the bar code on the target object.

In a multi-camera workstation, each imaging camera is operative to capture an image from a predetermined field of view. The multi-camera workstation generally also includes one or more illumination light sources operative to project illumination patterns in a plurality of predetermined directions. The light intensities of these illumination patterns can be very bright. In certain circumstances, some of the project illumination patterns can be reflected by the windows of the workstation, and the reflected illumination patterns can be annoying to the people positioned near the workstation.

Accordingly, it is desirable to find a better method to minimize user exposures to the bright light projected from the multi-camera workstation.

SUMMARY

In one aspect, an apparatus includes a housing, an invisible illumination light source, and a visible illumination light source. The housing comprises a first window located in a generally horizontal plane and a second window located in a generally upright plane that intersects the generally horizontal plane. The invisible illumination light source is operative to project an invisible illumination pattern that is at least partially incident upon the first window or the second window after the invisible illumination pattern is projected out of the housing. The visible illumination light source operative to project a visible illumination pattern out of the housing, and the visible illumination pattern has a visible center ray propagating in a direction different from the invisible center ray of the invisible illumination pattern.

In another aspect, an apparatus includes a housing, an invisible illumination light source, and an accompanying visible illumination light source associated with the invisible illumination light source. The housing comprises a first window located in a generally horizontal plane and a second window located in a generally upright plane that intersects the generally horizontal plane. The invisible illumination light source is operative to project an invisible illumination pattern that is at least partially incident upon the first window or the second window after the invisible illumination pattern is projected out of the housing. The accompanying visible illumination light source is operative to project a accompanying visible illumination pattern when motion is detected and a barcode is not detected. The accompanying visible illumination pattern propagates generally in the same direction that the invisible illumination pattern propagates.

Implementations of the invention can include one or more of the following advantages. The chances of exposing people near the workstation to the bright light projected from the workstation can be reduced. People are less likely to be offended by the bright light projected from the workstation. These and other advantages of the present invention will become apparent to those skilled in the art upon a reading of the following specification of the invention and a study of the several figures of the drawings.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 3A-3F are schematics of a bi-optical workstation that has six solid-state imagers in accordance with some embodiments.

FIG. 4A shows a group of other optical components associated the solid-state imager C1 in FIG. 3A in accordance with some embodiments.

Figure 1:
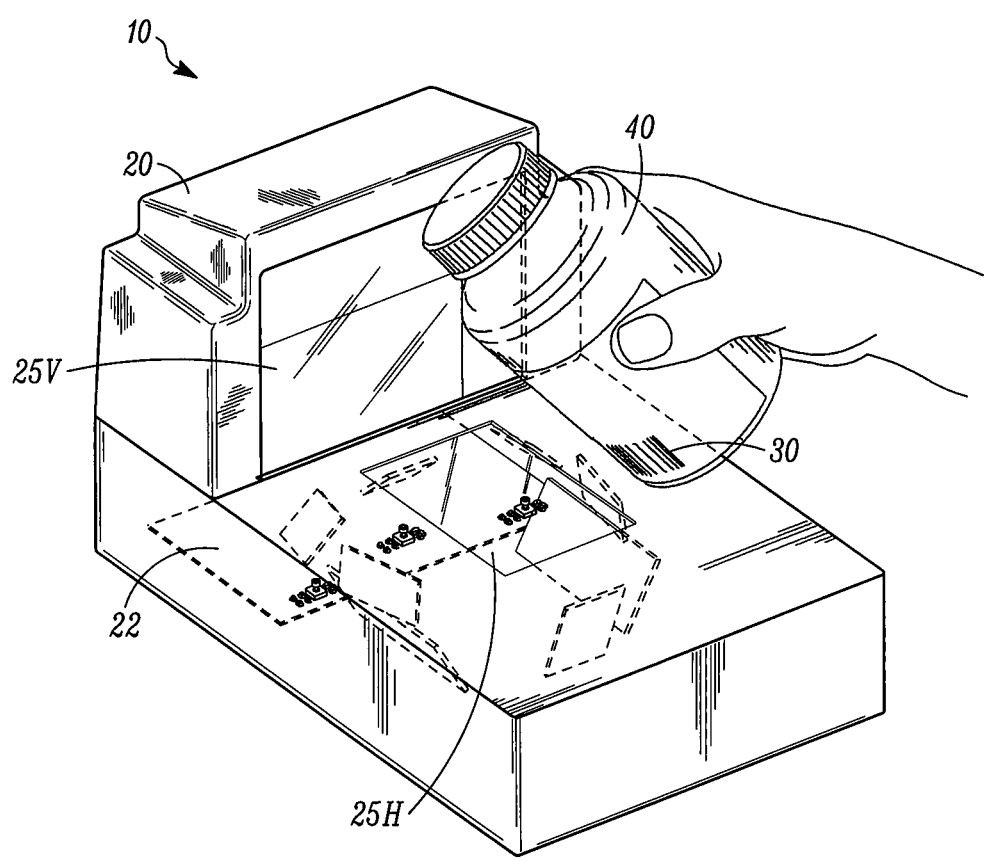
FIG. 1 depicts a workstation in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 depicts a workstation 10 in accordance with some embodiments. The workstation 10 is stationary and includes a housing 20. The housing 20 has a generally horizontal window 25H and a generally vertical window 25V. In one implementing, the housing 20 can be integrated into the sales counter of a point-of-transaction system. The point-of-transaction system can also includes a cash register, a touch screen visual display, a printer for generating sales receipts, or other type user interface. The workstation 10 can be used by retailers to process transactions involving the purchase of products bearing an identifying target, such as UPC symbols.

In accordance with one use, either a sales person or a customer will present a product or target object 40 selected for purchase to the housing 20. More particularly, a target bar code 30 imprinted or affixed to the target object will be presented in a region near the windows 25H and 25V for reading, that is, imaging and decoding of the coded indicia of the target bar code. Upon a successful reading of the target bar code, a visual and/or audible signal will be generated by the workstation 10 to indicate to the user that the target bar code 30 has been successfully imaged and decoded.

Figure 2:
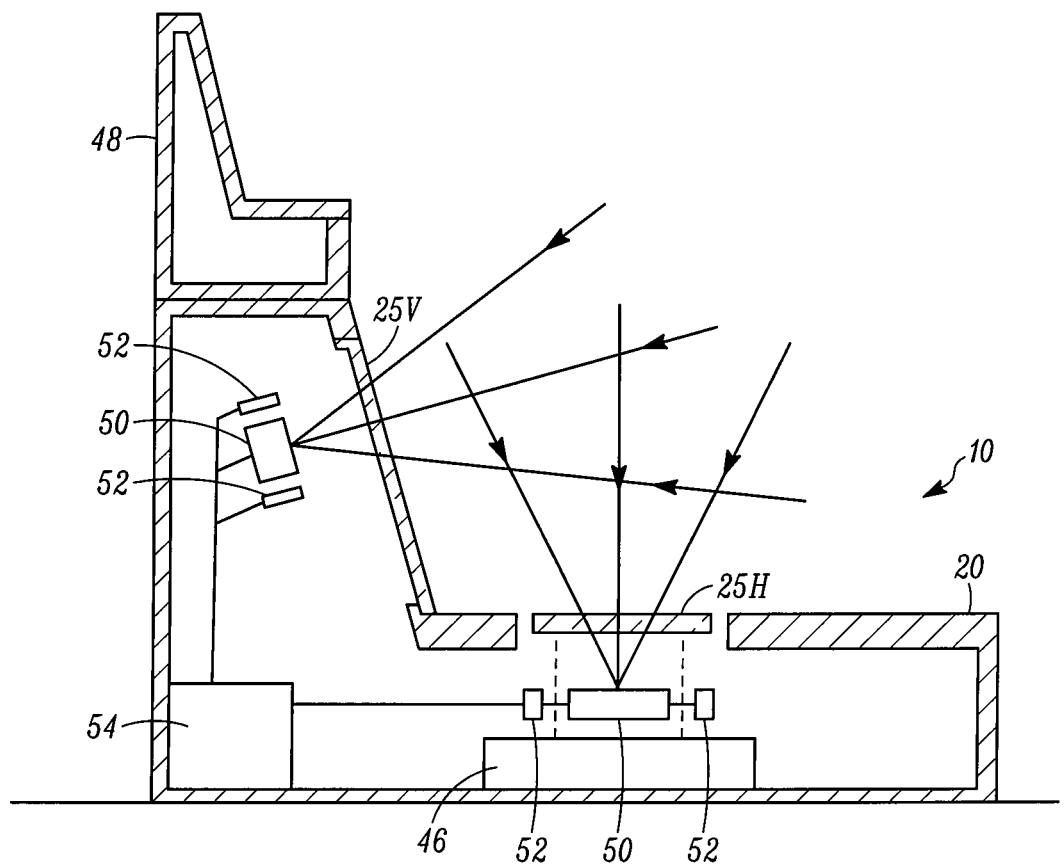
FIG. 2 is a schematic of a bi-optical workstation that includes a plurality of solid-state imagers in accordance with some embodiments.

As schematically shown in FIG. 2, a plurality of solid-state imagers 50, each including an illuminator 52, are mounted at the workstation 10, for capturing light passing through either or both windows from a target which can be a one- or two-dimensional symbol, such as a two-dimensional symbol on a driver's license, or any document, as described below. Each imager 50 is a solid-state area array, preferably a CCD or CMOS array. The imagers 50 and their associated illuminators 52 are operatively connected to a programmed microprocessor or controller 54 operative for controlling the operation of these and other components. Preferably, the microprocessor is the same as the one used for decoding the return light scattered from the target and for processing the captured target images.

In operation, the microprocessor 54 sends successive command signals to the illuminators 52 to pulse the LEDs for a short time period of 300 microseconds or less, and successively energizes the imagers 50 to collect light from a target only during said time period, also known as the exposure time period. By acquiring a target image during this brief time period, the image of the target is not excessively blurred.

As previously stated, FIG. 2 is only a schematic representation of an all imager-based workstation as embodied in a bi-optical workstation with two windows. The workstation can have other kinds of housings with different shapes. The workstation can have one window, two windows, or with more than two windows. In some embodiments, the workstation can include between three to six solid-state imagers. The bi-optical workstation can also include more than six solid-state imagers.

FIGS. 3A-3F are schematics of a bi-optical workstation that has six solid-state imagers in accordance with some embodiments. In FIGS. 3A-3F, the bi-optical workstation includes six solid-state imagers C1, C2, C3, C4, C5, and C6. commonly mounted on a printed circuit board 22. The printed circuit board 22 lies in a generally horizontal plane generally parallel to, and below, the generally horizontal window 25H. FIGS. 5A-5F depict illumination patterns 210, 220, 230, 240, 250, and 260 that are respectively associated with solid-state imagers C1, C2, C3, C4, C5, and C6.

As shown in FIG. 3A, the solid-state imager C1 faces generally vertically upward toward an inclined folding mirror M1-$a$ directly overhead at the left side of the horizontal window 25H. The folding mirror M1-$a$ faces another inclined narrow folding mirror M1-$b$ located at the right side of the horizontal window 25H. The folding mirror M1-$b$ faces still another inclined wide folding mirror M1-$c$ adjacent the mirror M1-$a$. The folding mirror M1-$c$ faces out through the generally horizontal window 25H toward the right side of the workstation.

Figure 5A:
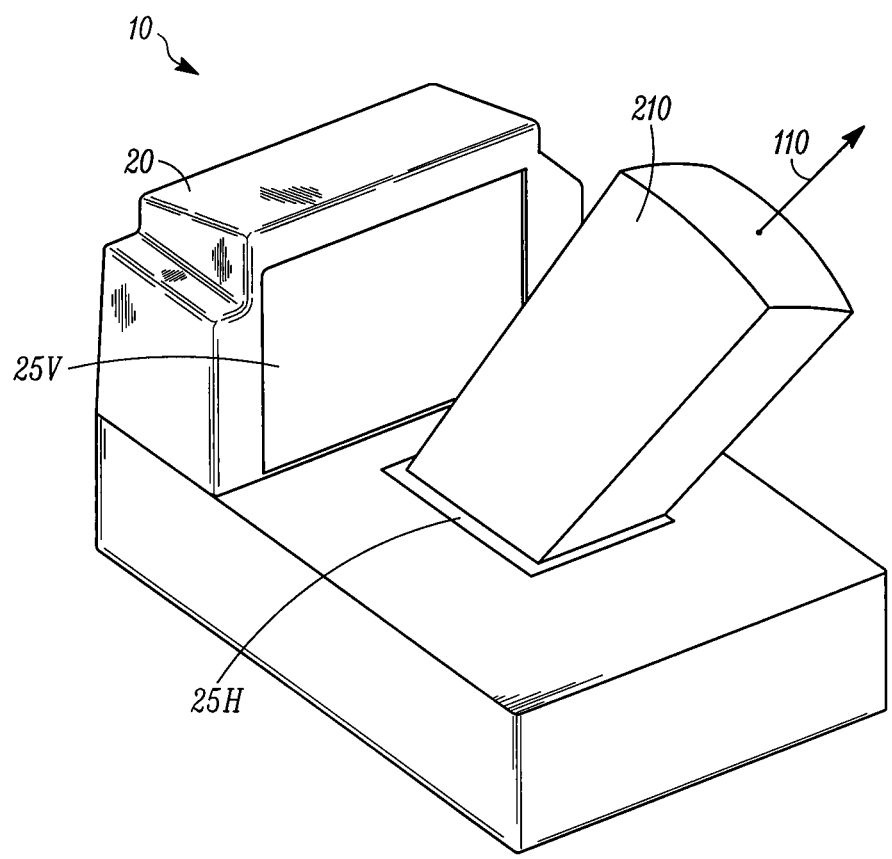
FIGS. 5A-5F depict a plurality of illumination patterns with the solid-state imagers in accordance with some embodiments.

In FIG. 3A, it is shown that the solid-state imager C1 is also associated with a group of other optical components 80. FIG. 4A shows the group of other optical components 80 in details. In FIG. 4A, it is shown that the solid-state imager C1 includes a sensor array 81 and an imaging lens 82. It is also shown that two light emitting diodes 85$a$ and 85$b$, spaced apart, are installed closely adjacent to the sensor array 81. When the light emitting diode 85$a$ (or 85$b$) is energized, light emitted from the light emitting diode 85$a$ (or 85$b$) passes through a light pipe 86$a$ (or 86$b$) and a lens 87$a$ (or 87$b$). As shown in FIG. 3A, light emitted from the light emitting diode 85$a$ (or 85$b$), after bouncing off the folding mirrors M1-$a$, M1-$b$, and M1-$c$ sequentially, exits the housing 20 as the first illumination pattern 210 centered by the light ray 110. FIG. 5A shows that the first illumination pattern 210 centered by the light ray 110 exits the housing 20 in a first predetermined direction.

In FIG. 3A, the folding mirrors M1-$a$, M1-$b$, and M1-$c$ also constitute part of an optical system for defining a predetermined field of view for the solid-state imager C1. Similar to the first illumination pattern 210 in FIG. 5A, the predetermined field of view for the solid-state imager C1 generally is also centered by the light ray 110. In addition, the predetermined field of view for the solid-state imager C1 is preferably within the first illumination pattern 210 as shown in FIG. 5A.

Figure 3B:
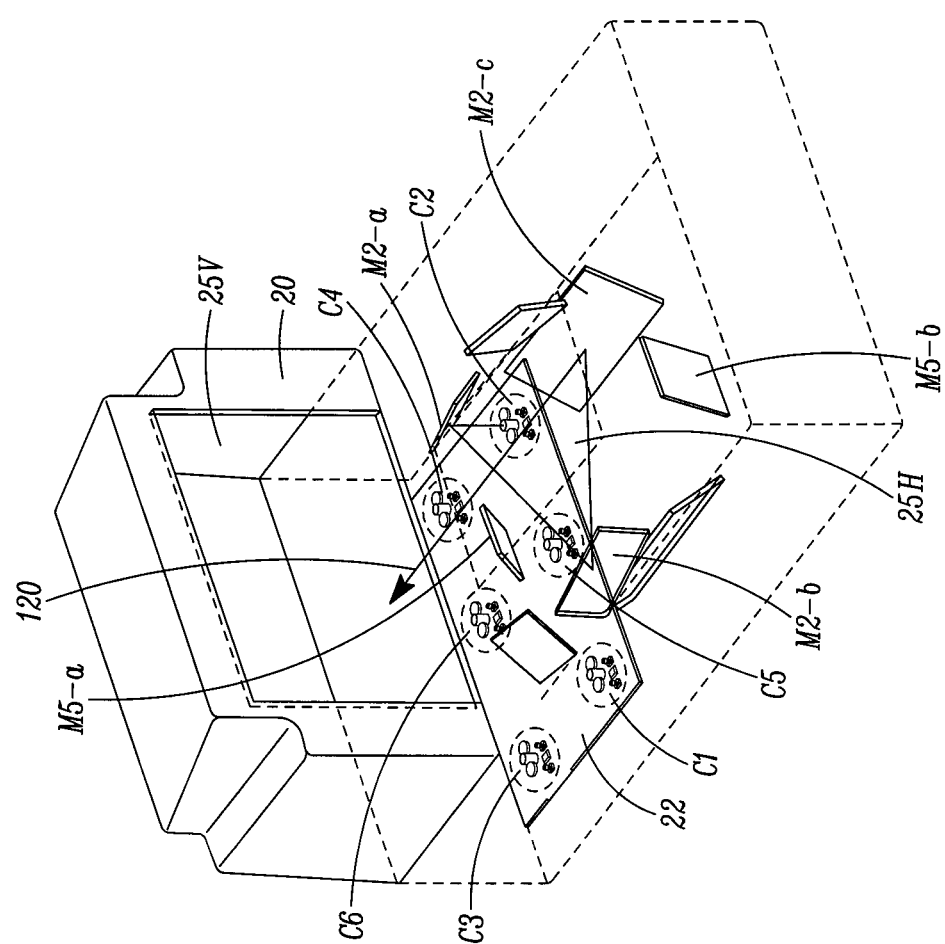
Figure 5B:
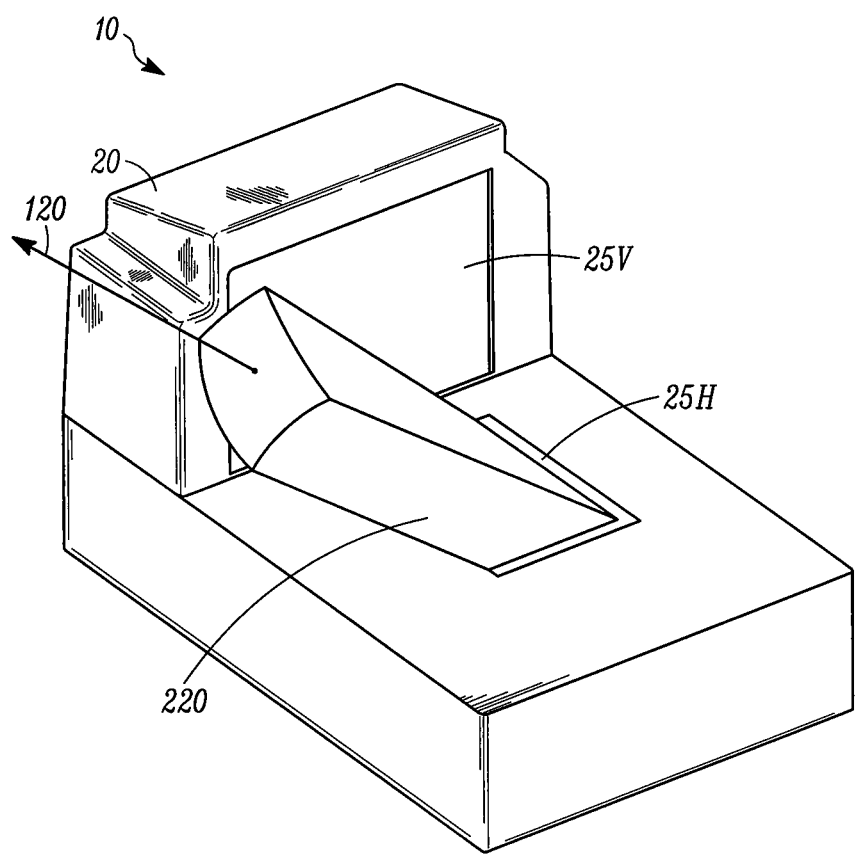

FIG. 3B and FIG. 5B depict respectively the optical path for the solid-state imager C2 and the second illumination pattern 220 associated with the solid-state imager C2. The solid-state imager C2 and its associated optics in FIG. 3B is mirror symmetrical to the solid-state imager C1 and its associated optics in FIG. 3A. As shown in FIG. 3B, the solid-state imager C2 faces generally vertically upward toward an inclined folding mirror M2-$a$ directly overhead at the right side of the horizontal window 25H. The folding mirror M2-$a$ faces another inclined narrow folding mirror M2-$b$ located at the left side of the horizontal window 25H. The folding mirror M2-$b$ faces still another inclined wide folding mirror M2-$c$ adjacent the mirror M2-$a$. The folding mirror M2-$c$ faces out through the generally horizontal window 25H toward the left side of the workstation.

In FIG. 3B, when a light emitting diode associated with solid-state imager C2 is energized, light emitted from such light emitting diode, after bouncing off the folding mirrors M2-$a$, M2-$b$, and M2-$c$ sequentially, exits the housing 20 as the second illumination pattern 220 centered by the light ray

120. FIG. 5B shows that the second illumination pattern 220 centered by the light ray 120 exits the housing 20 in a second predetermined direction.

Figure 3C:
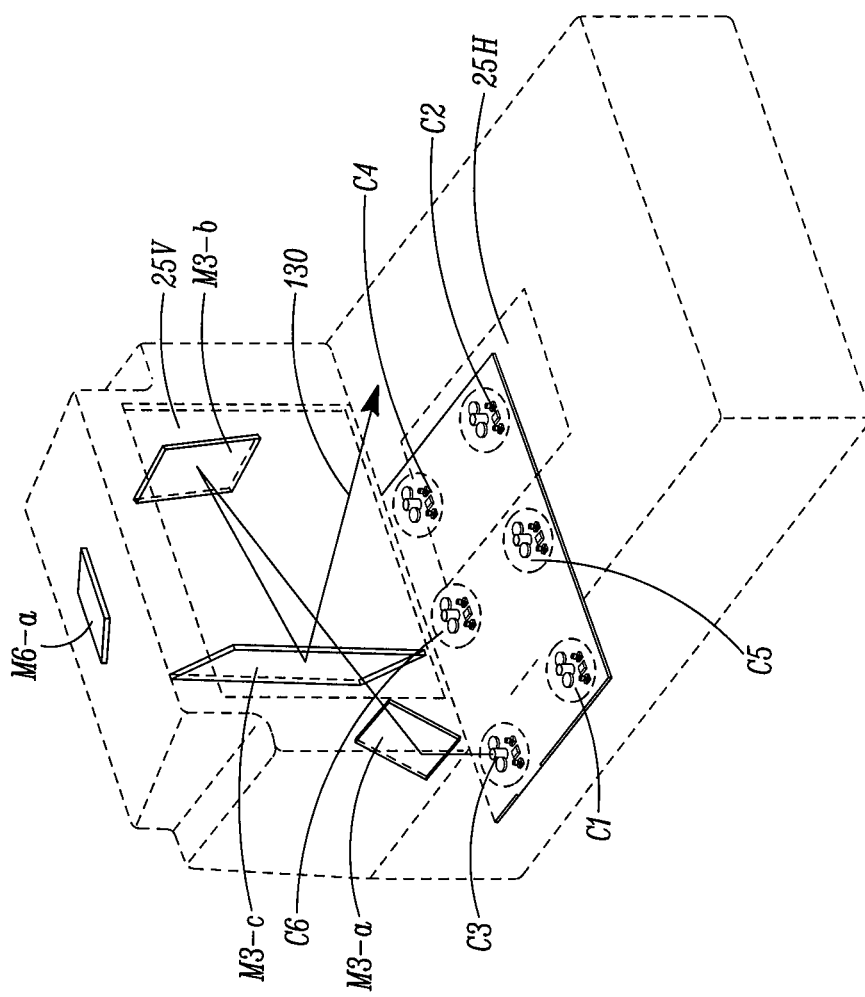
Figure 5C:
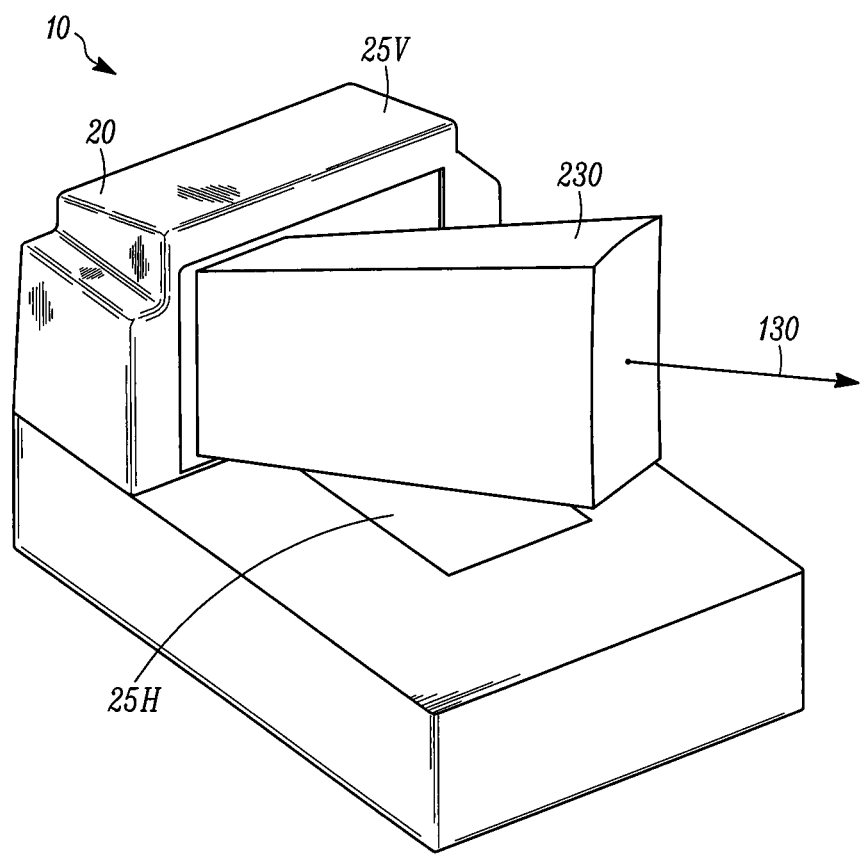

FIG. 3C and FIG. 5C depict respectively the optical path for the solid-state imager C3 and the third illumination pattern 230 associated with the solid-state imager C3. In FIG. 3C, the solid-state imager C3 faces generally vertically upward toward an inclined folding mirror M3-*a* directly overhead at the left side of the vertical window 25V. The folding mirror M3-*a* faces another inclined narrow folding mirror M3-*b* located at the right side of the vertical window 25V. The folding mirror M3-*b* faces still another inclined wide folding mirror M3-*c* adjacent the mirror M3-*a*. The folding mirror M3-*c* faces out through the generally vertical window 25V toward the right side of the workstation.

In FIG. 3C, when a light emitting diode associated with solid-state imager C3 is energized, light emitted from such light emitting diode, after bouncing off the folding mirrors M3-*a*, M3-*b*, and M3-*c* sequentially, exits the housing 20 as the third illumination pattern 230 centered by the light ray 130. FIG. 5C shows that the third illumination pattern 230 centered by the light ray 130 exits the housing 20 in a third predetermined direction.

Figure 3D:
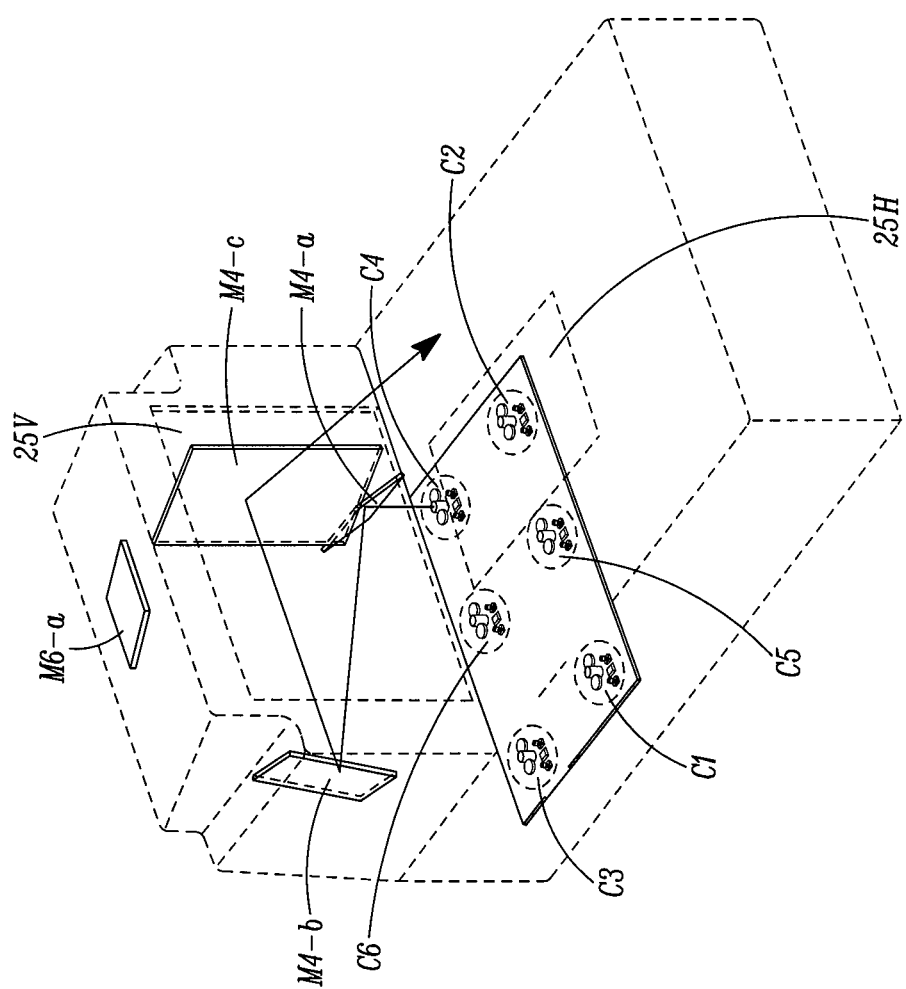
Figure 5D:
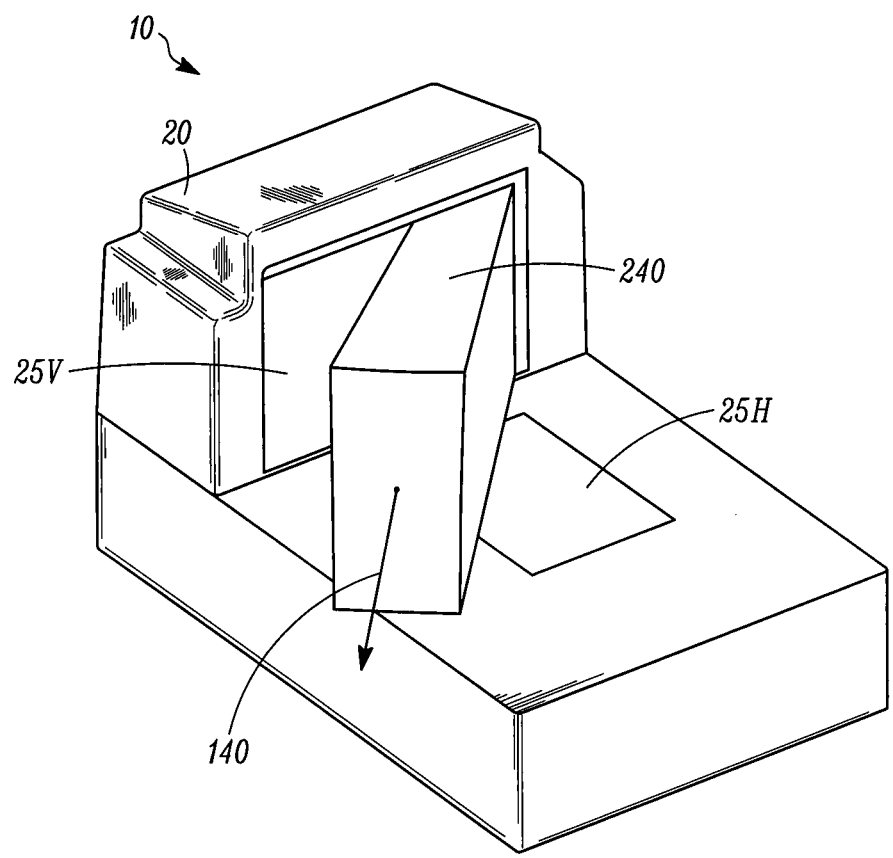

FIG. 3D and FIG. 5D depict respectively the optical path for the solid-state imager C4 and the fourth illumination pattern 240 associated with the solid-state imager C4. The solid-state imager C4 and its associated optics in FIG. 3D is mirror symmetrical to the solid-state imager C3 and its associated optics in FIG. 3C. In FIG. 3D, the solid-state imager C4 faces generally vertically upward toward an inclined folding mirror M4-*a* directly overhead at the right side of the vertical window 25V. The folding mirror M4-*a* faces another inclined narrow folding mirror M4-*b* located at the left side of the vertical window 25V. The folding mirror M4-*b* faces still another inclined wide folding mirror M4-*c* adjacent the mirror M4-*a*. The folding mirror M4-*c* faces out through the generally vertical window 25V toward the left side of the workstation.

In FIG. 3D, when a light emitting diode associated with solid-state imager C4 is energized, light emitted from such light emitting diode, after bouncing off the folding mirrors M4-*a*, M4-*b*, and M4-*c* sequentially, exits the housing 20 as the fourth illumination pattern 240 centered by the light ray 140. FIG. 5D shows that the fourth illumination pattern 240 centered by the light ray 140 exits the housing 20 in a forth predetermined direction.

Figure 3E:
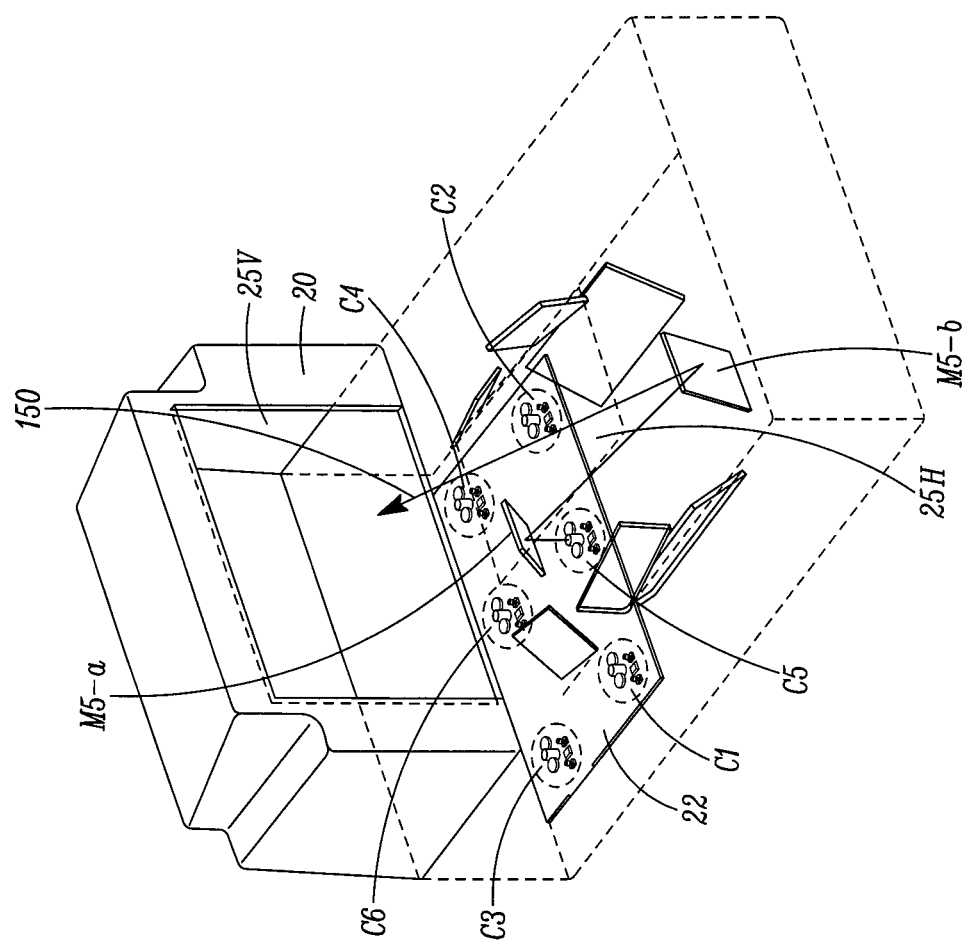
Figure 5E:
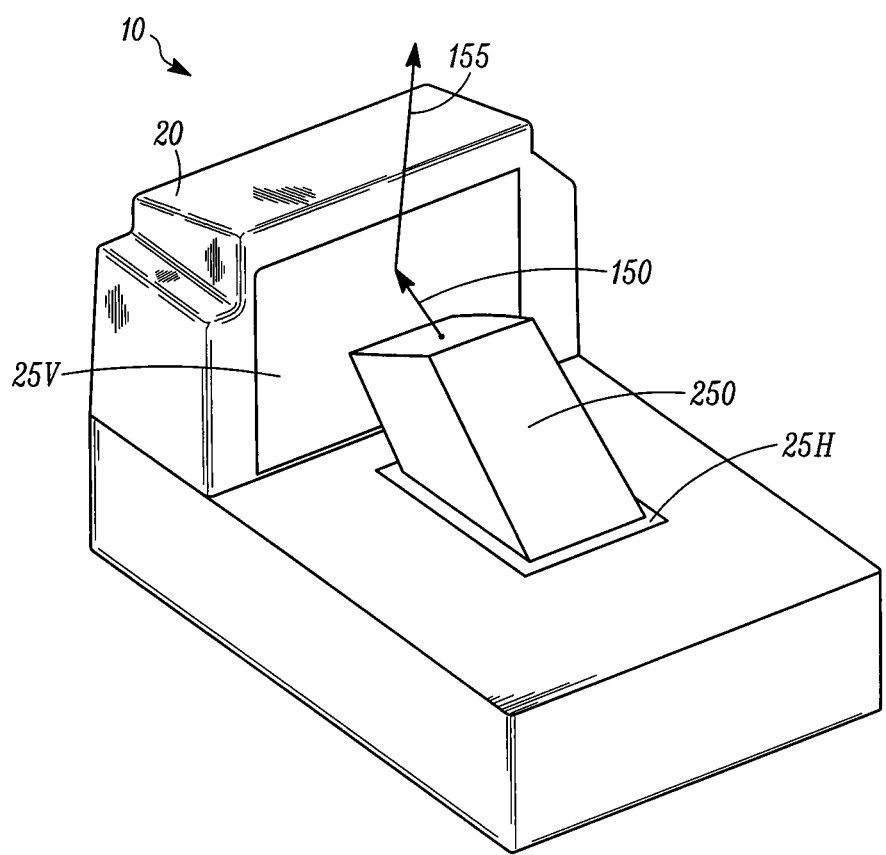

FIG. 3E and FIG. 5E depict respectively the optical path for the solid-state imager C5 and the fifth illumination pattern 250 associated with the solid-state imager C5. In FIG. 3E, the solid-state imager C5 and its associated optics are located generally near a center area between the solid-state imagers C1 and C2. The solid-state imager C5 faces generally vertically upward toward an inclined folding mirror M5-*a* that is located directly overhead of the solid-state imager C5 and generally near a center area at one end of the window 25H. The folding mirror M5-*a* faces another inclined folding mirror M5-*b* located at the opposite end of the window 25H. The folding mirror M5-*b* faces out through the window 25H in an upward direction.

In FIG. 3E, when a light emitting diode associated with solid-state imager C5 is energized, light emitted from such light emitting diode, after bouncing off the folding mirrors M5-*a* and M5-*b* sequentially, exits the housing 20 as the fifth illumination pattern 250 centered by the light ray 150. FIG. 5E shows that the fifth illumination pattern 250 centered by the light ray 150 exits the housing 20 in a fifth predetermined direction.

Figure 3F:
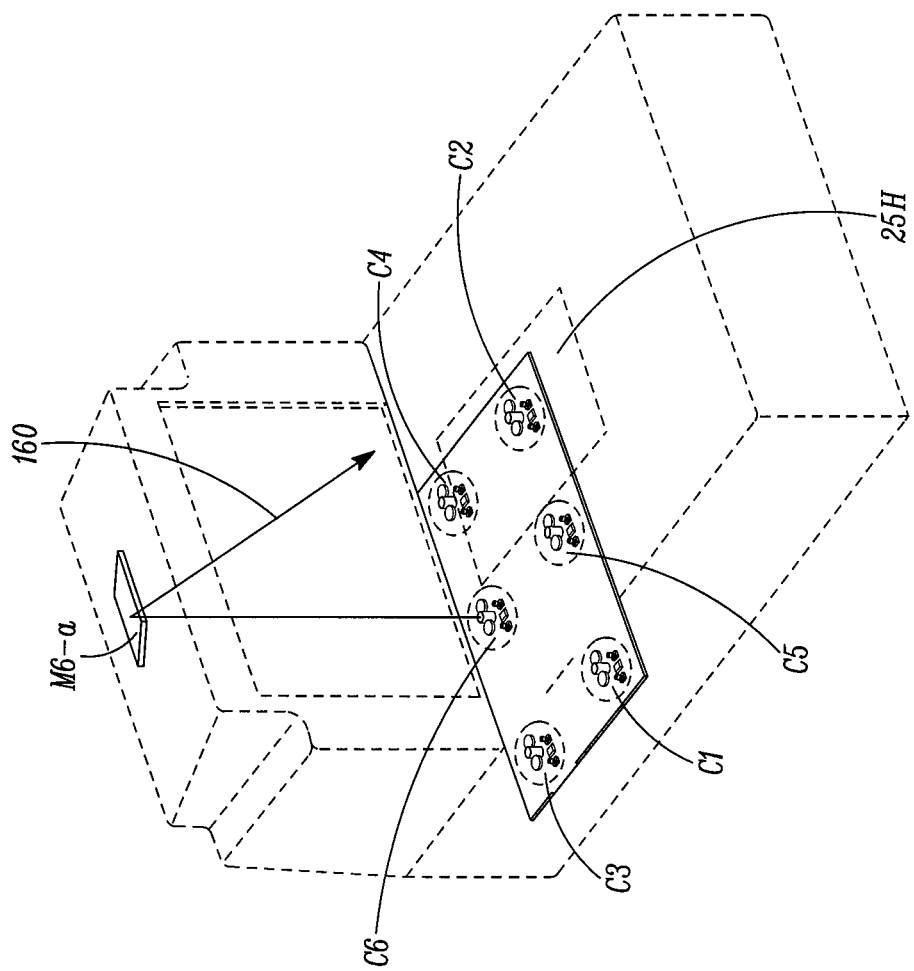
Figure 5F:
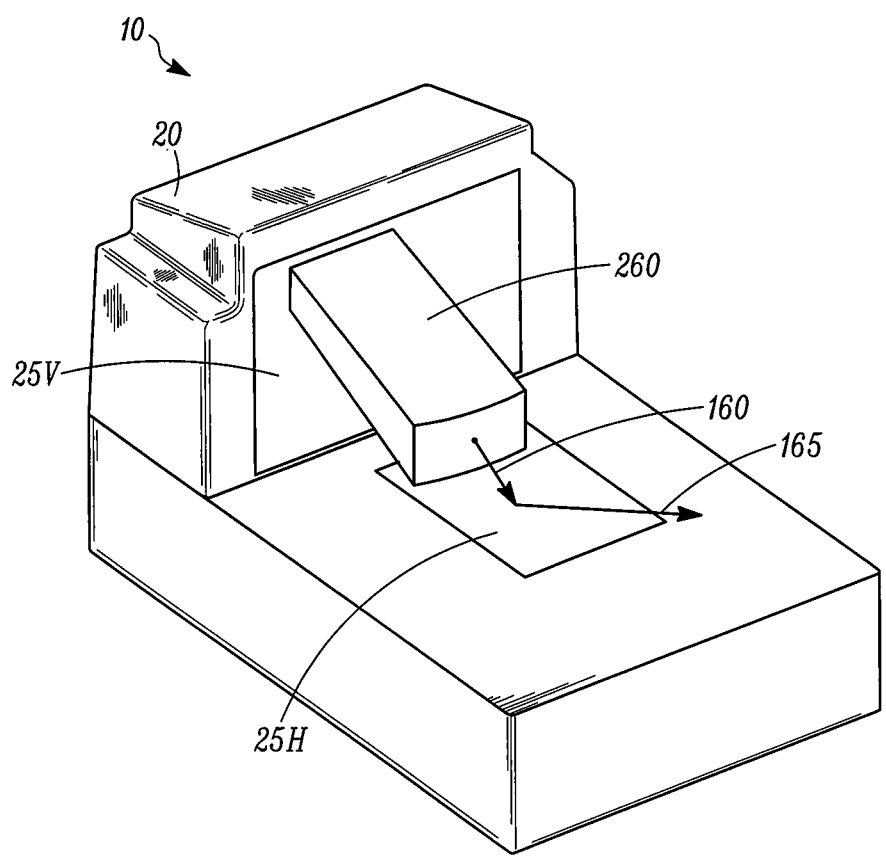

FIG. 3F and FIG. 5F depict respectively the optical path for the solid-state imager C6 and the fifth illumination pattern 260 associated with the solid-state imager C6. In FIG. 3F, the solid-state imager C6 and its associated optics are located generally near a center area between the solid-state imagers C3 and C4. The solid-state imager C6 faces generally vertically upward toward an inclined folding mirror M6-*a* that is located directly overhead of the solid-state imager C6 and generally near a center area at an upper end of the window 25V. The folding mirror M6-*a* faces out through the window 25V in a downward direction toward the countertop of the workstation.

In FIG. 3F, when a light emitting diode associated with solid-state imager C5 is energized, light emitted from such light emitting diode, after bouncing off the folding mirror M6-*a*, exits the housing 20 as the six illumination pattern 260 centered by the light ray 160. FIG. 5E shows that the sixth illumination pattern 260 centered by the light ray 160 exits the housing 20 in a six predetermined direction.

In some of the existing designs of the workstation, the illumination patterns projected out of the workstation can be very bright. Some of these illumination patterns can be reflected by the horizontal window 25H or the vertical window 25V. For example, as shown in FIG. 3E, the light ray 150 and the associated illumination pattern 250 can be reflected by the vertical window 25V, and the light ray 150 becomes a light ray 155 after the reflection. As another example, as shown in FIG. 3F, the light ray 160 and the associated illumination pattern 260 can be reflected by the horizontal window 25H, and the light ray 160 becomes a light ray 165 after the reflection. These reflected illumination patterns can be annoying to the users positioned in front of the horizontal window 25H or the vertical window 25V. It is desirable to find some methods to minimize the amount of the reflected light as perceived by the users.

In one embodiment, an invisible illumination light source is used to generate the illumination pattern 250. For example, as shown in FIG. 3E, one or more light emitting diodes associated with the solid-state imager C5 can be energized to emit infrared light. Such infrared light, after bouncing off the folding mirrors M5-*a* and M5-*b* sequentially, exits the housing 20 as an infrared illumination pattern 250 centered by the light ray 150. Such infrared illumination pattern is invisible to the users, even it is reflected by the vertical window 25V and enters the eyes of the users. In addition to the infrared light source, other kinds of invisible light source, such ultraviolet light source can also be used as the illumination light source associated with the solid-state imager C5. In another example, as shown in FIG. 3F, an invisible light source can be used as the illumination light source associated with the solid-state imager C6 for generating an invisible illumination pattern 260 centered by the light ray 160. The illumination light sources associated with other solid-state imagers (e.g., C1, C2, C3, and C4) can be visible illumination light sources. These illumination light sources can also be invisible illumination light sources or some combination of visible and invisible illumination light sources.

Additionally, in another implementation, an invisible illumination light source associated with a given solid-state imager can be associated with an accompanying visible illumination light source. The accompanying visible illumination light source can be used to project an accompanying illumination pattern out the windows of the workstation. The accompanying visible illumination pattern generally can propagate in the same direction that the invisible illumination pattern propagates.

In one implementing, when an object is moved across the countertop of the workstation, if the presence of an object is detected by the workstation, the workstation can start an initial decoding process with the invisible illumination pattern. If a barcode is successfully decoded, the user will be notified about the successful decoding with certain visual or audio signals, and the accompanying visible illumination light source will be kept turning off. Alternatively, if no barcode is successfully decoded with the initial decoding process after a predetermined time period (e.g., 1.0 second), the workstation can start a subsequent decoding process with the accompanying visible illumination pattern by turning on the accompanying visible illumination light. If a barcode can be successfully decoded with the visible illumination pattern, the user again can be notified about the successful decoding with certain visual or audio signals. Alternatively, after some time period, if a barcode still can not be successfully decoded with the visible illumination pattern, the accompanying visible illumination light will be tuned off.

In general, the predetermined time period allocated for decoding a barcode with the invisible illumination pattern can be chosen anywhere between 0.5 second to 10 seconds. In some implementations, the invisible illumination pattern can be generated by turning on the invisible illumination light source after the presence of an object is detected. In other implementations, the invisible illumination pattern can be generated by keeping the invisible illumination light source continuously turned on.

The above implementation of decoding a barcode first with the invisible illumination pattern can have the advantage that most of the time the operator will not see any illumination. When the accompanying visible illumination light source is turned on, the accompanying visible illumination pattern generated is often blocked by the object in its path.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
  placing a plurality of solid-state imagers within a housing for capturing light from a plurality of predetermined fields of view, wherein the housing comprises a first window located in a generally horizontal plane and a second window located in a generally upright plane that intersects the generally horizontal plane;

starting an initial decoding process with an invisible illumination pattern after the presence of an object is detected; wherein the initial decoding process includes the steps of imaging and decoding one or more barcode on the object; and starting a subsequent decoding process with an accompanying visible illumination pattern by turning on the accompanying visible illumination light source if no barcode is successfully decoded with the initial decoding process after a predetermined time period, wherein the subsequent decoding process includes the steps of imaging and decoding one or more barcode on the object.

2. The method of claim 1, wherein the invisible illumination pattern is at least partially incident upon the first window or the second window after the invisible illumination pattern is projected out of the housing.

3. The method of claim 1, further comprising: generating the invisible illumination pattern by turning on an infrared illumination light source.

4. The method of claim 1, further comprising: generating the invisible illumination pattern by turning on an invisible illumination light source after the presence of an object is detected.

5. The method of claim 1, further comprising: generating the invisible illumination pattern by keeping an invisible illumination light source turned on continuously.

6. The method of claim 1, wherein the accompanying visible illumination pattern propagates generally in the same direction that the invisible illumination pattern propagates.

7. An apparatus comprising:

a housing defining a housing interior region, wherein the housing comprises a first window located in a generally horizontal plane and a second window located in a generally upright plane that intersects the generally horizontal plane;

an imaging system including a plurality of solid-state imagers, located within the housing interior region, operative to capture light from a plurality of predetermined fields of view;

an invisible illumination light source operative to project an invisible illumination pattern;

an accompanying visible illumination light source associated with the invisible illumination light source for projecting accompanying a visible illumination pattern propagates generally in the same direction that the invisible illumination pattern propagates; and a controller operative to (1) start an initial decoding process with the invisible illumination pattern after the presence of an object is detected, wherein the initial decoding process includes the steps of imaging and decoding one or more barcode on the object, and (2) start a subsequent decoding process with the accompanying visible illumination pattern by turning on the accompanying visible illumination light source if no barcode is successfully decoded with the initial decoding process after a predetermined time period, wherein the subsequent decoding process includes the steps of imaging and decoding one or more barcode on the object.

8. The apparatus of claim 7, wherein the invisible illumination light source is operative to project an invisible illumination pattern that is at least partially incident upon the first window or the second window after the invisible illumination pattern is projected out of the housing.

9. The apparatus of claim 7, wherein the controller is operative to turn on the invisible illumination light source after the presence of an object is detected.

10. The apparatus of claim 7, wherein the controller is operative to turn on the invisible illumination light source continuously.

11. The apparatus of claim 7, wherein: the invisible illumination light source includes an infrared illumination light source.

12. The apparatus of claim 7, wherein the plurality of solid-state imagers includes a solid-state imager that has a two-dimensional sensor arrays.

* * * * *